US005902659A

United States Patent [19]

Lewin

[11] Patent Number: 5,902,659

[45] Date of Patent: May 11, 1999

[54] FLEXIBLE LABELING SYSTEM

[76] Inventor: Thomas M. Lewin, 1200 Nicollet Mall, #201, Minneapolis, Minn. 55403

[21] Appl. No.: 08/852,139

[22] Filed: May 6, 1997

[51] Int. Cl.$^{6}$ ..... B32B 3/06

[52] U.S. Cl. ..... 428/42.2; 428/194; 283/81; 40/359; 40/630

[58] Field of Search ..... 428/40.1, 42.2, 428/194; 283/81; 281/15.1, 36; 40/359, 626, 630, 638

[56] References Cited

U.S. PATENT DOCUMENTS

| | | | |
|---|---|---|---|
| 913,162 | 2/1909 | Rand | 40/23 |
| 1,115,216 | 10/1914 | Laviolette | 40/23 |
| 2,248,355 | 7/1941 | Jones | 40/16 |
| 2,815,595 | 12/1957 | Davis | 40/23 |
| 2,952,087 | 9/1960 | Chamberlin | 428/40.1 |
| 4,201,403 | 5/1980 | Turner | 283/21 |
| 4,232,461 | 11/1980 | Crawford | 40/23 A |
| 4,972,615 | 11/1990 | Grant | 40/641 |
| 5,018,765 | 5/1991 | Barnete | 40/359 |
| 5,735,549 | 4/1998 | Konkol et al. | 283/81 |

FOREIGN PATENT DOCUMENTS

| | | |
|---|---|---|
| 1565587 | 3/1969 | France . |
| 345066 | 3/1931 | United Kingdom . |
| 438290 | 11/1935 | United Kingdom . |
| 749942 | 6/1956 | United Kingdom . |
| 1354353 | 5/1974 | United Kingdom . |

OTHER PUBLICATIONS

PCT–WO 93/20547, Oct. 14, 1993, Nyberg, et al.

*Primary Examiner*—Alexander Thomas
*Attorney, Agent, or Firm*—Hugh D. Jaeger

[57] ABSTRACT

A flexible labeling system applied to spines of various bound documents such as books without imprinted or embossed titles on their back bindings, wire coil bound documents, plastic comb bound documents, photo albums which are too thin to readily hold identification labels, and brochures of various kinds that have no identification means that can be seen when they are standing side-by-side on shelves. The flexible labeling system permits users to easily and conveniently provide labeling for these types of documents. The flexible labeling system is comprised of a flexible plastic member incorporating two living hinges, adhesive strips attached thereto, and a centrally located stiffener to which standard adhesive labels may be applied. Alternatively, there is provided a flexible labeling system for use with plastic comb bound documents made of a one-piece plastic member which hookingly engages the plastic comb binding. There is also provided a flexible labeling system for use with wire coil bound documents made of a one-piece plastic member which hookingly engages the coils of a wire coil bound document.

34 Claims, 16 Drawing Sheets

FLEXIBLE LABELING SYSTEM

CROSS REFERENCES TO CO-PENDING APPLICATIONS

None.

BACKGROUND OF THE INVENTION

1. Field of the Invention

The present invention is for a flexible labeling system, and more particularly, pertains to a labeling system which identifies magazines, photo albums, file folders, wire coil bound documents, plastic comb bound documents and other narrow documents which have a spine that is too small for recognizable print.

2. Description of the Prior Art

Prior art labeling systems provided a labeling means in which an adhesive pocket for labels is applied directly to the spine of ring binders and other such thick documents. There are also labeling systems which are secured to the front and open sides of a file, album or document. Clearly what is needed is a labeling system for the spines of narrow documents which is easily readable when resting upright on a shelf and also which flexes when the document is opened to prevent damage to the document and the label.

SUMMARY OF THE INVENTION

The general purpose of the present invention is to provide a flexible labeling system for magazines, photo albums and other thin documents where the label is easily visible while the labeled material rests upright on a shelf. The flexibility of the flexible labeling system allows the labeled material to be opened and read without the label falling off, and without damage to the labeled material.

According to one embodiment of the present invention, there is provided a flexible labeling system, including flexible plastic members, living hinges, adhesive strips, peel-off protective strips, a stiffener and an adhesive label.

According to another embodiment of the present invention, there is provided a flexible labeling system for use with plastic comb bound documents made of a one-piece plastic member which hookingly engages the plastic comb binding.

According to another embodiment of the present invention, there is provided a flexible labeling system for use with wire coil bound documents made of a one-piece plastic member which hookingly engages the coils of a wire coil bound document.

One significant aspect and feature of the present invention is flexible plastic members which bend easily while still retaining their original shapes.

Other significant aspects and features of the present invention are adhesive strips which permanently secure or an alternative adhesive which can be easily removed when used temporarily.

A further significant aspect and feature of the present invention is a stiffener to which an adhesive label is adhered.

An additional significant aspect and feature of the present invention is an open space along the spine of a document that allows the document to be easily opened without damaging the labeling system or the document.

Still another significant aspect and feature of the present invention is the ability to label narrow documents on their spines in such a manner as to provide a visible label when the documents are shelved.

Yet another significant aspect and feature of the present invention is the provision for a security strip to be embedded into the stiffener.

Still another significant aspect and feature of the present invention is the hooking engagement of the flexible labeling system for use with plastic comb and wire coil bindings.

Having thus described significant aspects and features of the present invention, it is the principal object of the present invention to provide a flexible labeling system.

One object of the present invention is to provide a labeling system for narrow documents which can be easily read when the documents are shelved.

Another object of the present invention is to provide a document labeling system which will not tear when the document is open.

A further object of the present invention is to provide a document labeling system having an open space along the spine of the document which allows easy opening and closing of the document without damaging the document or the label.

An additional object of the present invention is the provision for a security strip to be incorporated into the labeling system.

Still another object of the present invention is to provide an extruded labeling system.

A further object of the present invention is to provide for the addition of adhesive strips.

Yet another object of the present invention is the hooking engagement provided for plastic comb and wire coil bound documents.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
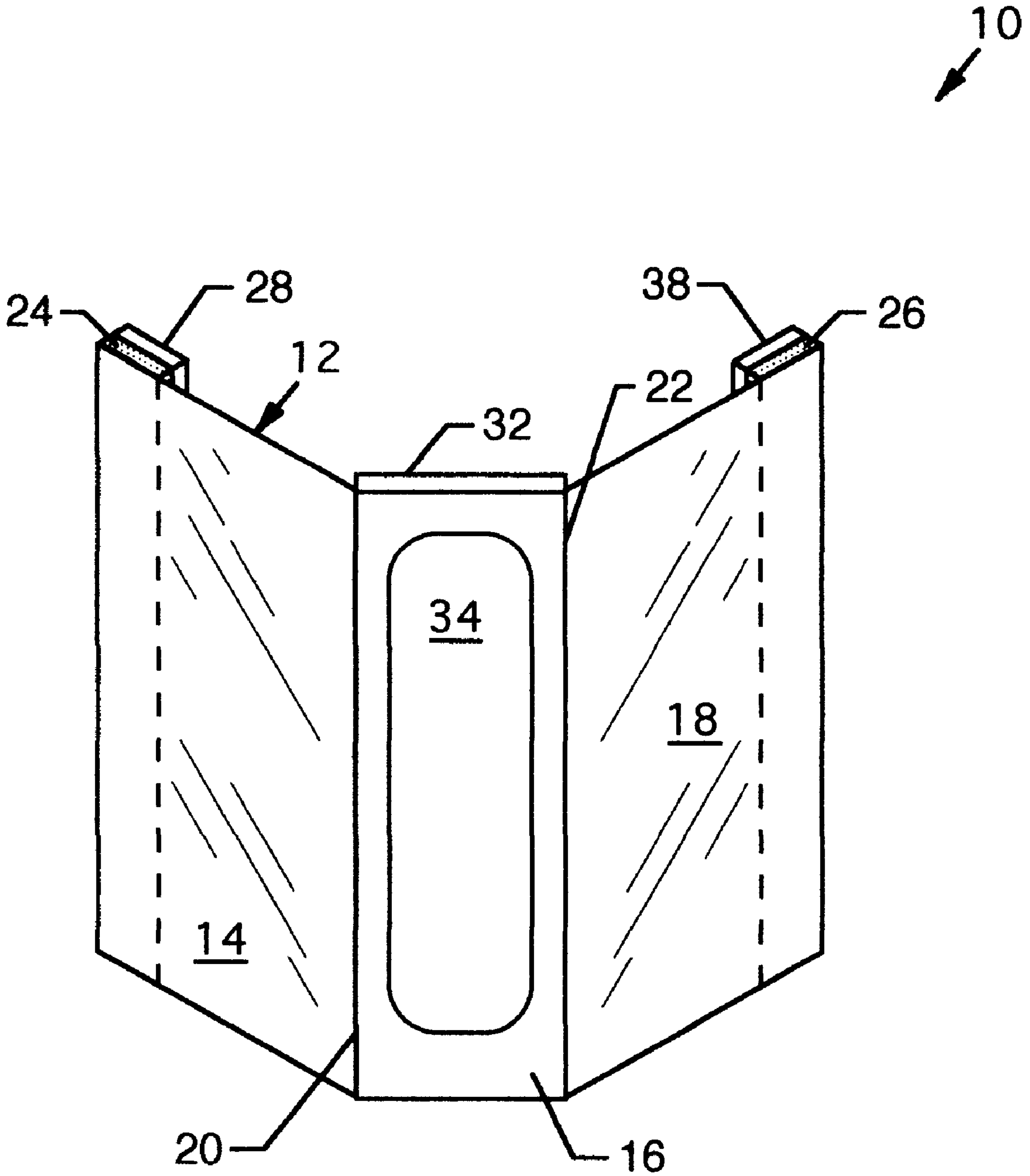
FIG. 1 illustrates an isometric view of a flexible labeling system, the present invention.

FIG. 1 illustrates an isometric view of a flexible labeling system 10, the present invention. The flexible labeling system 10 is comprised of a one-piece, flexible plastic member 12 made of Mylar film or other suitable plastic, having three substantially planar flexible plastic portions 14, 16 and 18 connected by living hinges 20 and 22. Portion 16 can be a substantially flat planar member. Adhesive strips 24 and 26 are adjacently aligned along the outer interior portions of flexible plastic portions 14 and 18, as illustrated in greater detail in FIG. 2. Peel-off protective strips 28 and 30 cover adhesive strips 24 and 26 prior to use. The adhesive strips 24 and 26 are made of, but not limited to, 3M F-9415PC low tack adhesive material which does not permanently set; so, if the flexible labeling system 10 only needs to be used temporarily, the flexible labeling system 10 may be easily removed and the peel-off protective strips 28 and 30 may be replaced over the adhesive strips 24 and 26 for future reuse. If the flexible labeling system 10 is permanent, the adhesive strips 24 and 26 are made of, but not limited to, 3M 950 tape, which is a high tack adhesive which will permanently set and secure to the document. Additional information on the adhesives is provided in Appendix 1. An adhesive label 34 is mounted to the exterior of flexible plastic portion 16 for identification purposes. Labeling of the document may also be attained by writing directly on flexible plastic portion 16. Also provided is a thin plastic stiffener 32, made of Lexan polycarbonate or other suitable plastic, which is slightly smaller than the area of flexible plastic portion 16 and which is secured to the interior of flexible plastic portion 16 by adhesive or other suitable methods such as, but not limited to, staples, RF bonding or ultrasonic welding. Alternatively, the flexible plastic member 12 and the thin plastic stiffener 32 can be extruded as a one-piece member.

Figure 2:
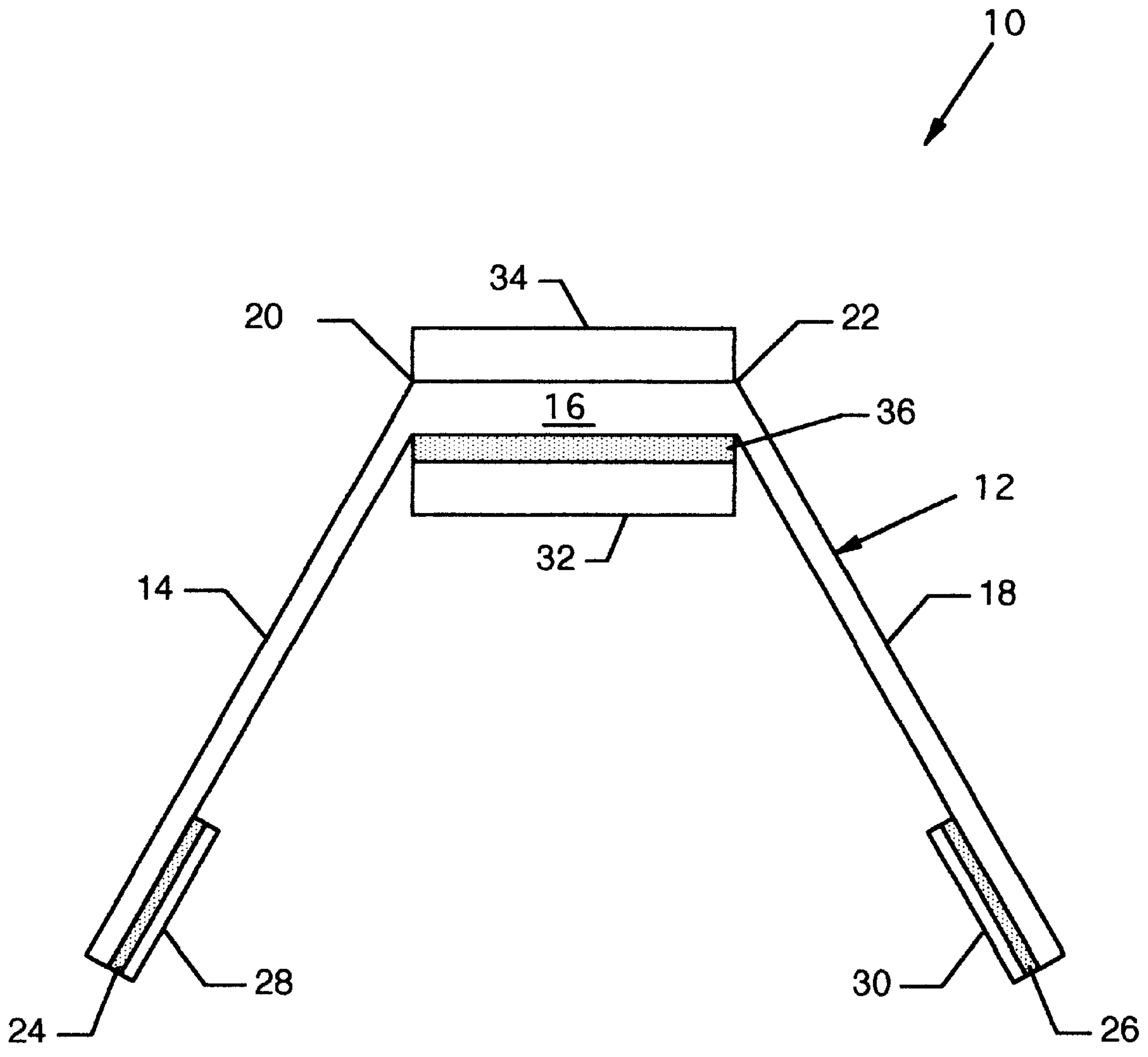
FIG. 2 illustrates an exaggerated end view of the flexible labeling system.

FIG. 2 illustrates an exaggerated end view of the flexible labeling system 10, where all numerals correspond to those elements previously described. This figure further illustrates the construction of the flexible labeling system 10. Shown in detail are the adhesive strips 24 and 26, the peel-off protective strips 28 and 30, and the adhesive 36 which secures stiffener 32 to the interior portion of flexible plastic portion 16. Preferably, the adhesive strips 24 and 26 extend along the entire interior edges of the flexible plastic portions 14 and 18, but this arrangement is not essential. Instead, the adhesive strips 24 and 26 could be in the form of discrete segments spaced along the interior edges of the flexible plastic portions 14 and 18. In this case, peel-off protective strips 28 and 30 having the same size as the individual segments can be provided, or peel-off protective strips 28 and 30 each having a length sufficient to cover all of the segments along a respective edge can be utilized.

MODE OF OPERATION

Figure 3:
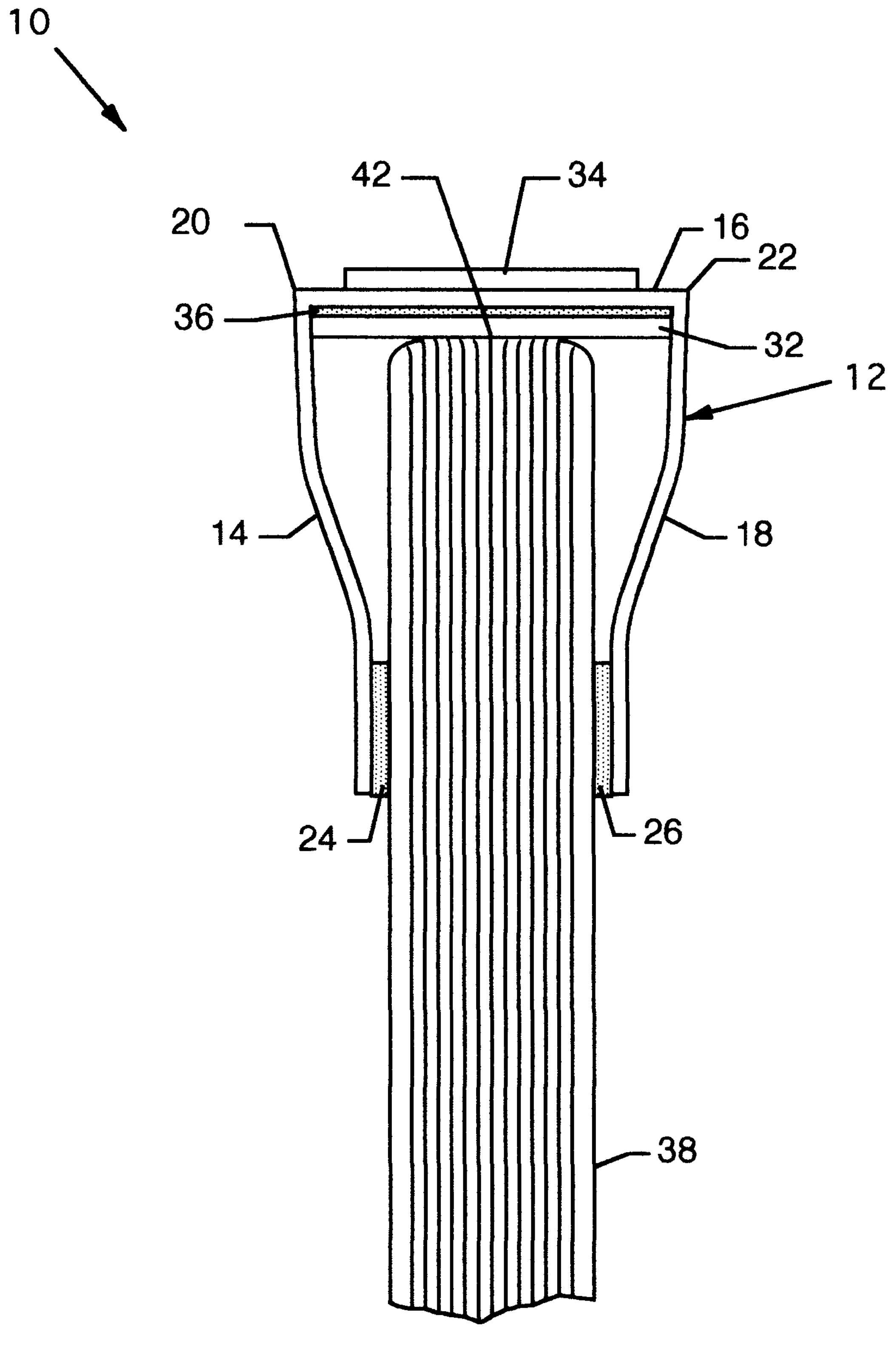
FIG. 3 illustrates an exaggerated end view of the flexible labeling system properly attached to a magazine in the closed position.

FIG. 3 illustrates an exaggerated end view of the flexible labeling system 10 properly attached to a magazine 38 in the closed position, where all numerals correspond to those elements previously described. A magazine 38 having spine 42 is used for illustrative purposes, but the flexible labeling system 10 can be effectively used with photo albums, brochures, files, folders, record albums or any other item on which a visible label is needed when shelved. Illustrated in detail is the flex exhibited by flexible plastic portions 14 and 18 of the flexible plastic member 12. In order to maintain consistent vertical alignment of the flexible labeling system 10 along the spine 42 of a magazine 38, the spine 42 of magazine 38 is aligned along living hinge 20 where peel-off protective strip 28 is removed from adhesive strip 24 and flexible plastic portion 14 is secured to the magazine 38, as shown. The spine 42 of magazine 38 is then centered on the interior of stiffener 32. Peel-off protective strip 30 is then removed from adhesive strip 26 and flexible plastic portion 18 is also secured to the magazine 38, as shown. Magazine 38 is used for illustrative purposes and can be substituted with a photo album, book, brochure, etc.

Figure 4:
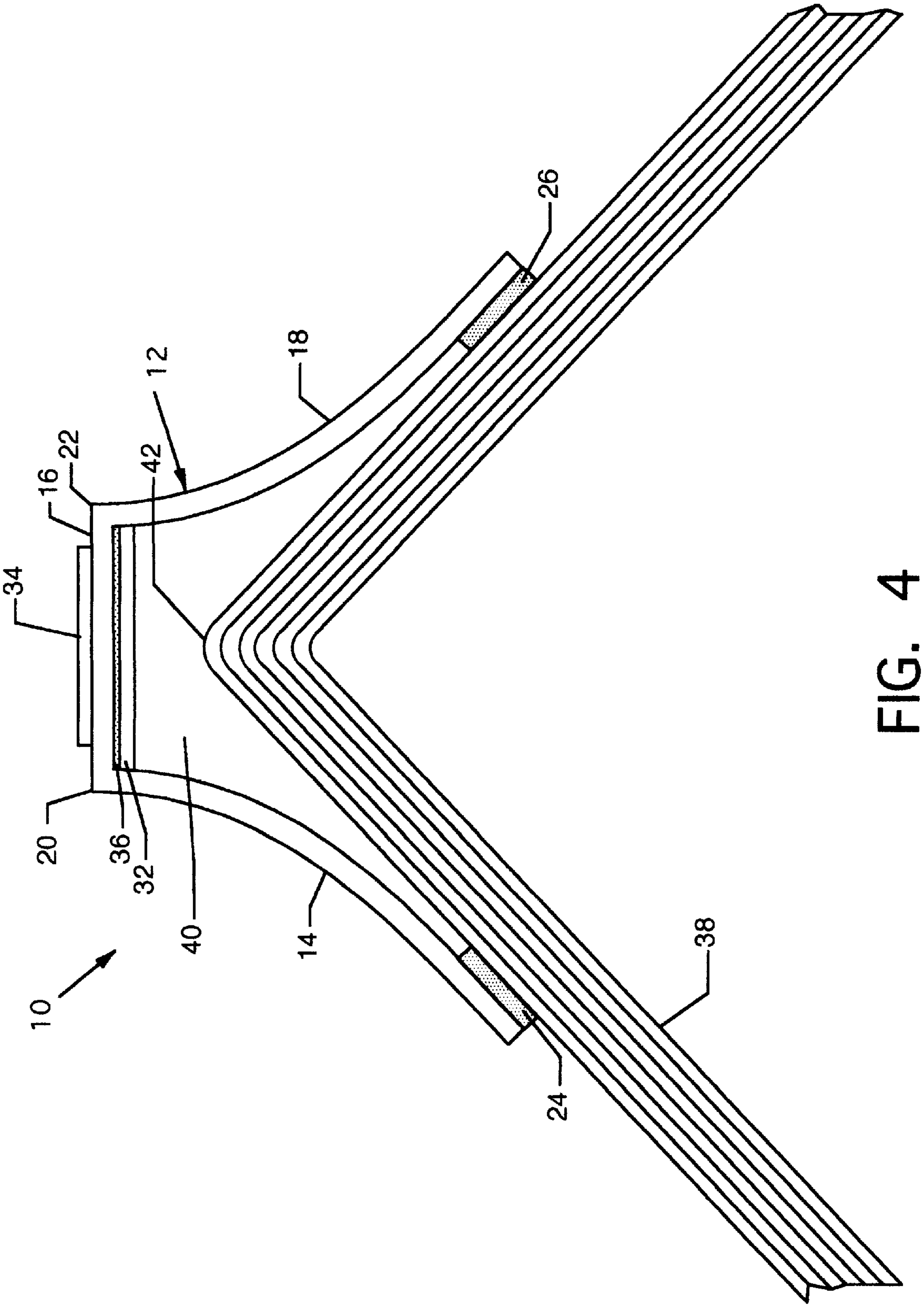
FIG. 4 illustrates an exaggerated end view of the flexible labeling system properly attached to a magazine in the open position.

FIG. 4 illustrates an exaggerated end view of the flexible labeling system 10 properly attached to a magazine 38 in the open position, where all numerals correspond to those elements previously described. Illustrated in particular is the flex exhibited by flexible plastic portions 14 and 18 and the variable geometry space 40 between stiffener 32 and the spine 42 of magazine 38. The variable geometry of space 40 is dependent on the extent of openness of the magazine 38.

ALTERNATIVE EMBODIMENTS

Figure 5:
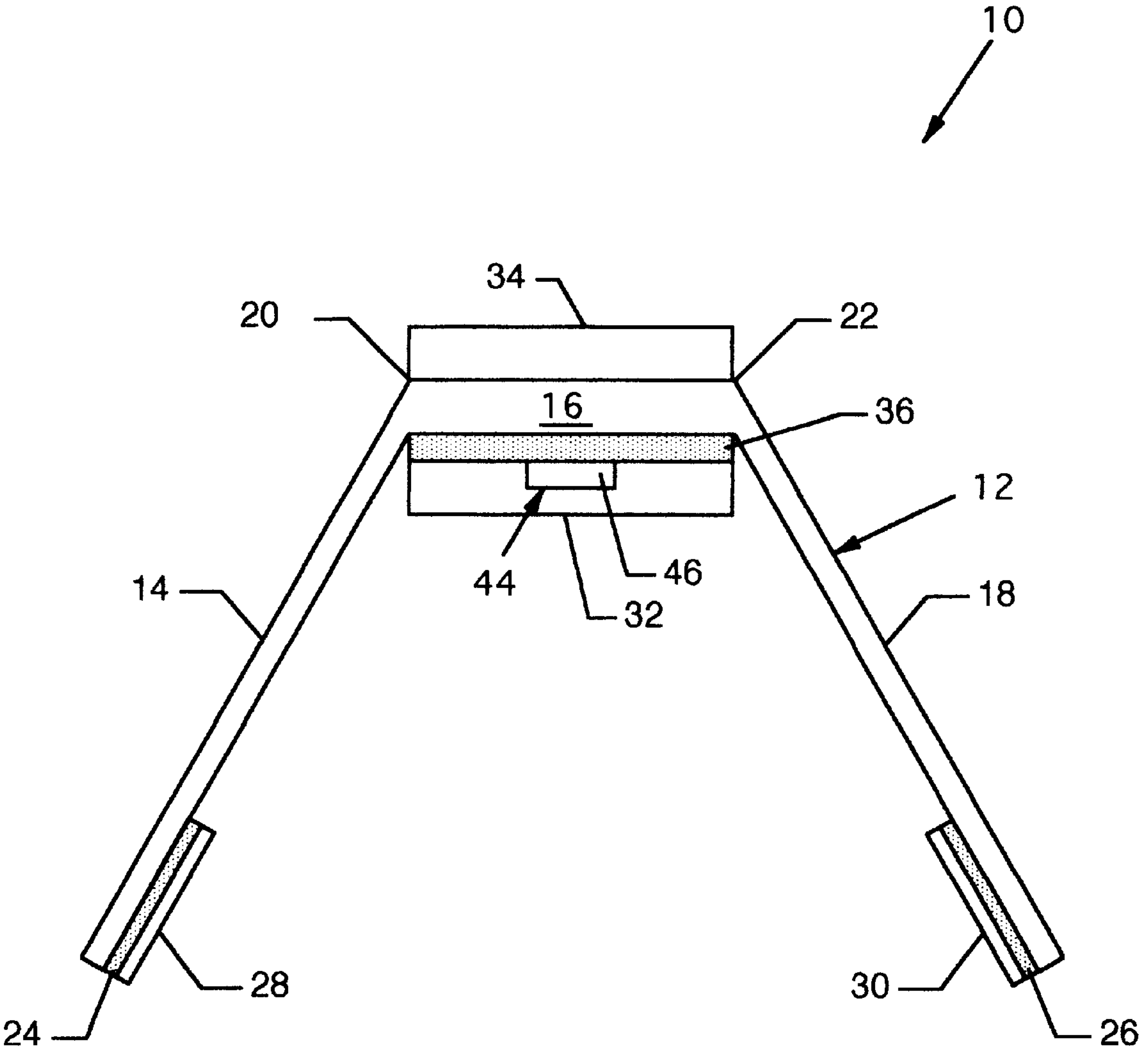
FIG. 5 illustrates an exaggerated end view of the flexible labeling system which incorporates a groove to accommodate a security strip.

FIG. 5 illustrates an exaggerated end view of the flexible labeling system 10 which incorporates a groove 44 to accommodate a security strip 46, where all numerals correspond to those elements previously described. Illustrated in particular is the security strip 46 which is secured to stiffener 32 before appropriately securing stiffener 32 to the interior of flexible plastic portion 16 of flexible plastic member 12. Incorporating security strip 46 into flexible labeling system 10 creates a one-step process for labeling and security of library goods and other documents where security and labeling are necessary. This combination also allows the security tagged item to be opened and closed repeatedly without damaging the security strip 46 and the flexible labeling system 10.

Figure 6:
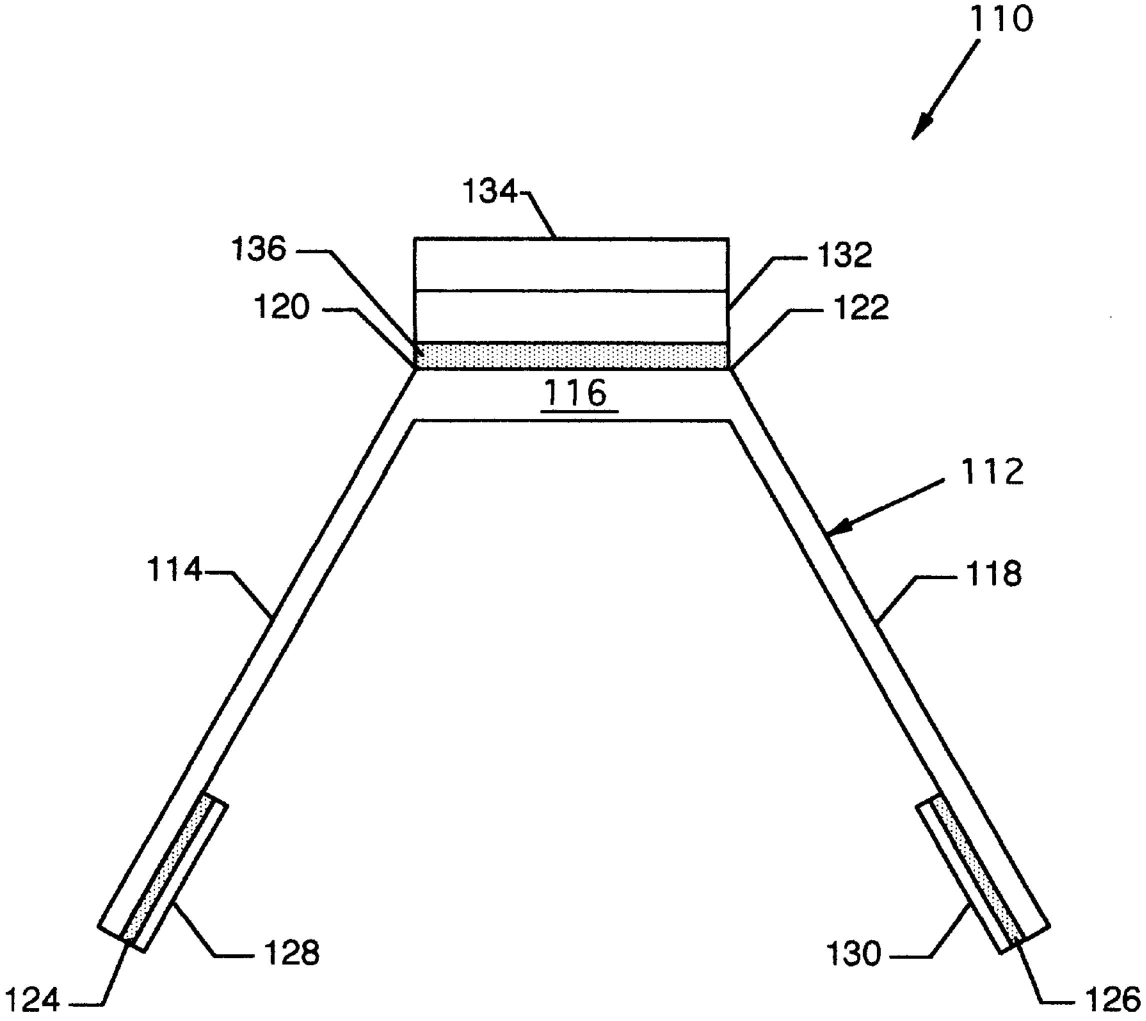
FIG. 6 illustrates an exaggerated end view of the flexible labeling system with the stiffener on the exterior of the flexible plastic member, the first alternative embodiment.

FIG. 6 illustrates an exaggerated end view of a flexible labeling system 110 with a stiffener 132 on the exterior of a flexible plastic portion 116 of a flexible plastic member 112, the first alternative embodiment. This alternative embodiment is designed, constructed and functions using the same principles taught in the preferred embodiment and has a flexible plastic member 112, substantially planar flexible plastic portions 114, 116 and 118, living hinges 120 and 122, adhesive strips 124 and 126, peel-off protective strips 128 and 130, a stiffener 132, an adhesive label 134, and adhesive 136. This embodiment features the stiffener 132 appropriately secured to the exterior of flexible plastic portion 116. Adhesive 136 is illustrated, but other methods of securing the stiffener 132 to the flexible plastic portion 116 may be used, as previously described in connection with FIG. 1.

Figure 7:
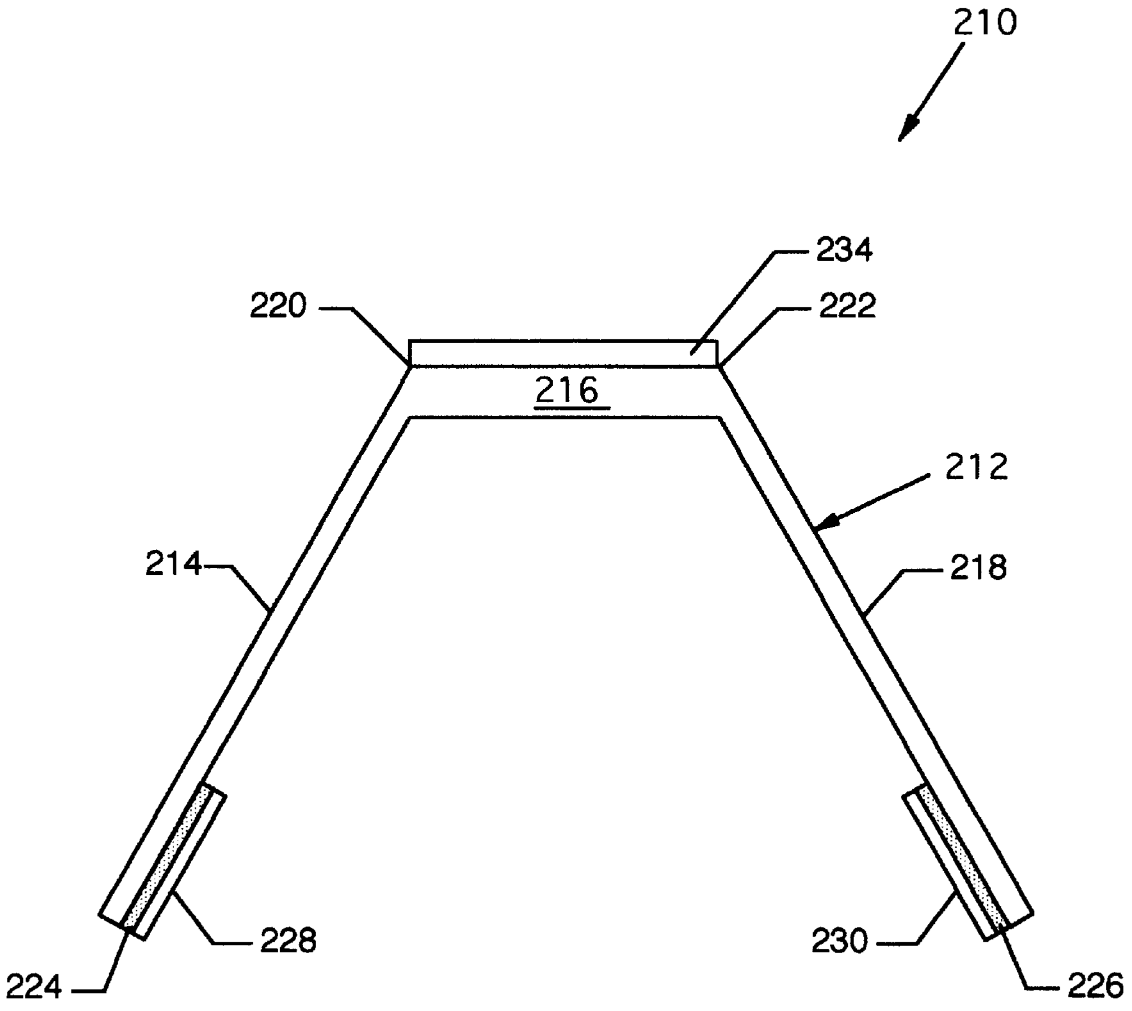
FIG. 7 illustrates an exaggerated end view of an extruded flexible labeling system, the second alternative embodiment.

FIG. 7 illustrates an exaggerated end view of an extruded flexible labeling system 210, the second alternative embodiment. This alternative embodiment is designed, constructed and functions using the same principles taught in the preferred embodiment and has living hinges 220 and 222, adhesive strips 224 and 226, peel-off protective strips 228 and 230, adhesive label 234, and an extruded flexible plastic member 212 which consists of flexible plastic portions 214 and 218 and a central thickened plastic portion 216 which can be rigid, semi-rigid or flexible. This embodiment features the central thickened plastic portion 216 which replicates and duplicates the function of the stiffener 32 and the flexible plastic portion 16 appropriately secured as previously described and as illustrated in FIG. 1.

Figure 8:
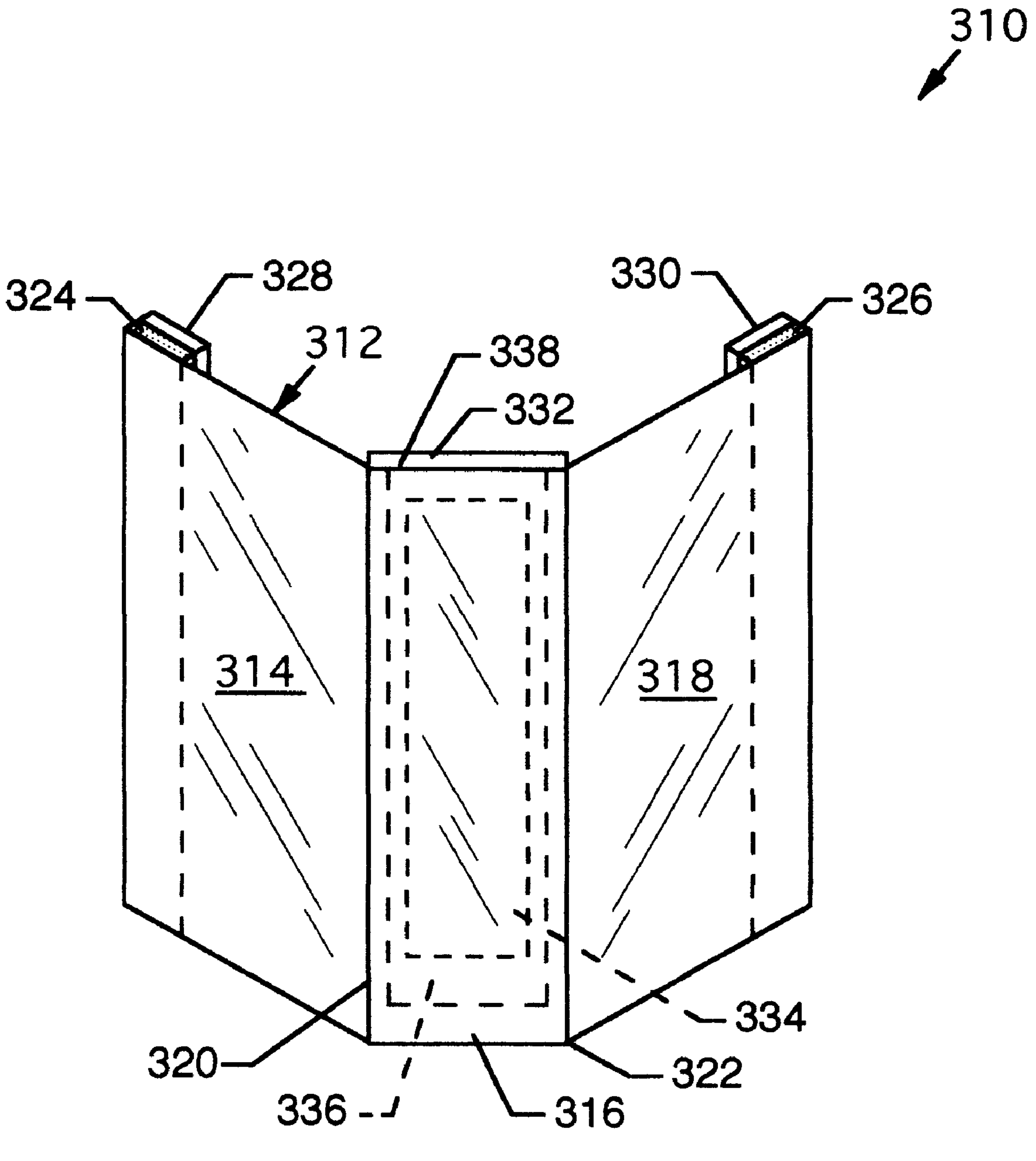
FIG. 8 illustrates an isometric view of a flexible labeling system incorporating a transparent label pocket, the third alternative embodiment.

FIG. 8 illustrates an isometric view of a flexible labeling system 310 incorporating a transparent label pocket 336, the third alternative embodiment. This alternative embodiment is designed, constructed and functions using the same principles taught in the preferred embodiment and has a flexible plastic member 312, flexible plastic portions 314, 316, and 318, living hinges 320 and 322, adhesive strips 324 and 326, peel-off protective strips 328 and 330, and a stiffener 332. Featured in this embodiment is a non-adhesive label 334 and a transparent label pocket 336. The label pocket is appropriately secured to the exterior of flexible plastic portion 316 by adhesive or other suitable methods such as, but not limited to, staples, RF bonding or ultrasonic welding. The transparent label pocket provides easy viewing of the non-adhesive label 334 which slides into the open end 338 of label pocket 336. The label pocket 336 allows non-adhesive labels to be generated in a typed or handwritten form which are easily removed and changed as needed.

Figure 9:
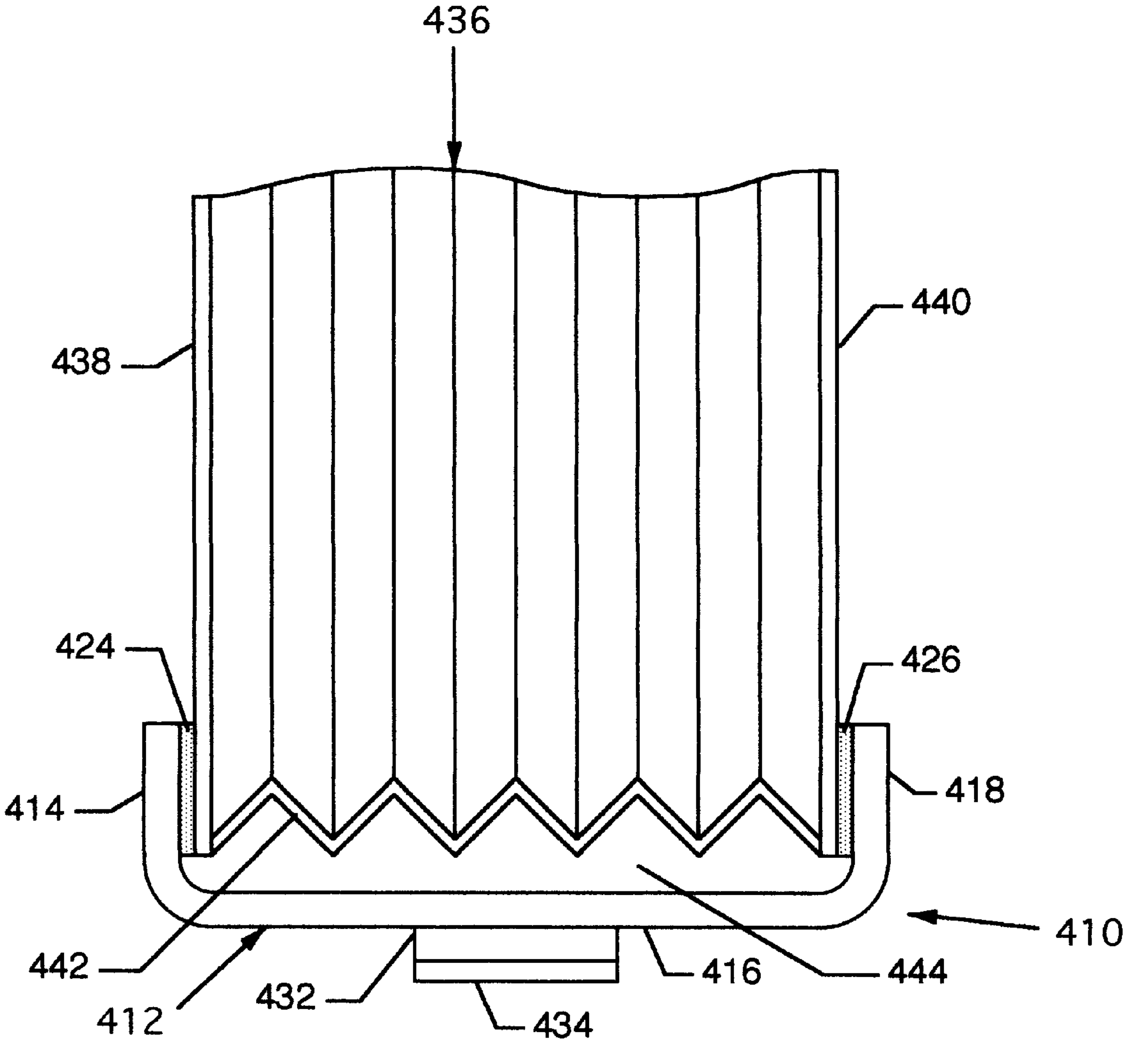
FIG. 9 and FIG. 10 illustrate an exaggerated top view of the flexible labeling system secured to an expandable file folder, the fourth alternative embodiment.
Figure 10:
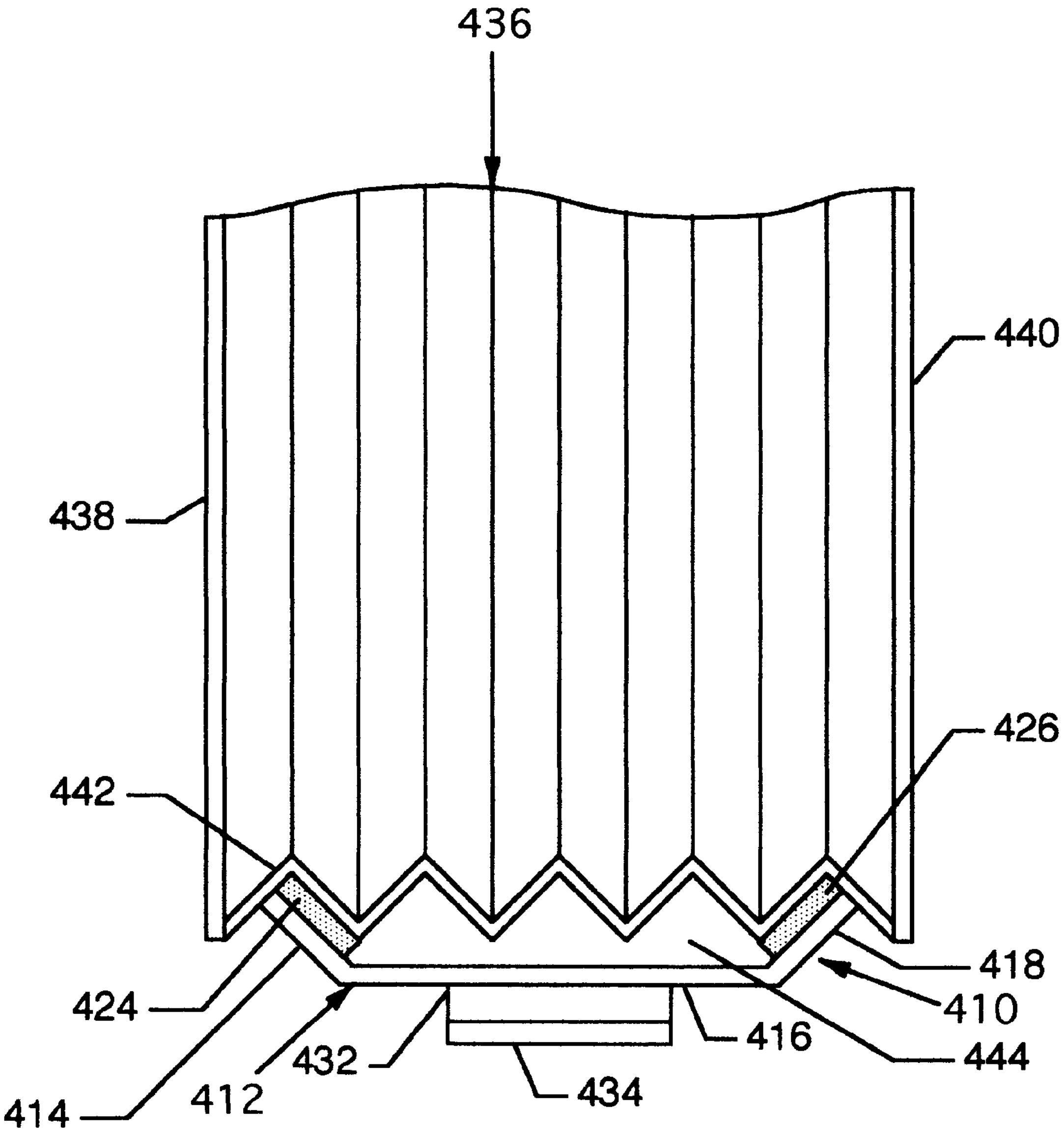

FIG. 9 and FIG. 10 illustrate an exaggerated top view of a flexible labeling system 410 attached to an expandable file folder 436, the fourth alternative embodiment. The flexible labeling system 410 is designed, constructed and functions using the principles taught in the previous embodiments, and has a flexible plastic member 412, flexible plastic portions 414, 416 and 418, adhesive strips 424 and 426, peel-off protective strips (not shown), a stiffener 432 and an adhesive label 434. The expandable file folder 436 is comprised of a bellows portion 442 which is secured between a front member 438 and a back member 440, as shown in FIG. 9 and FIG. 10.

FIG. 9 illustrates the flexible labeling system 410 adhered to the exterior of expandable file folder 436 where adhesive strips 424 and 426 are secured to the exterior of front and back members 438 and 440, respectively.

FIG. 10 illustrates the flexible labeling system 410 adhered to the exterior of expandable file folder 436 where adhesive strips 424 and 426 are secured to the exterior of bellows portion 442. This alternative embodiment features a space 444, as shown in FIG. 9 and FIG. 10, which allows the expandable file folder 436 to be filled and expanded without damaging the flexible labeling system 410 or the expandable file folder 436. This embodiment also allows the item provided with the flexible labeling system 410 to be viewed easily while shelved. Stiffener 432 may be of various sizes to accommodate various sizes of adhesive labels, depending on the amount of information to be contained on the adhesive label 434.

Figure 11:
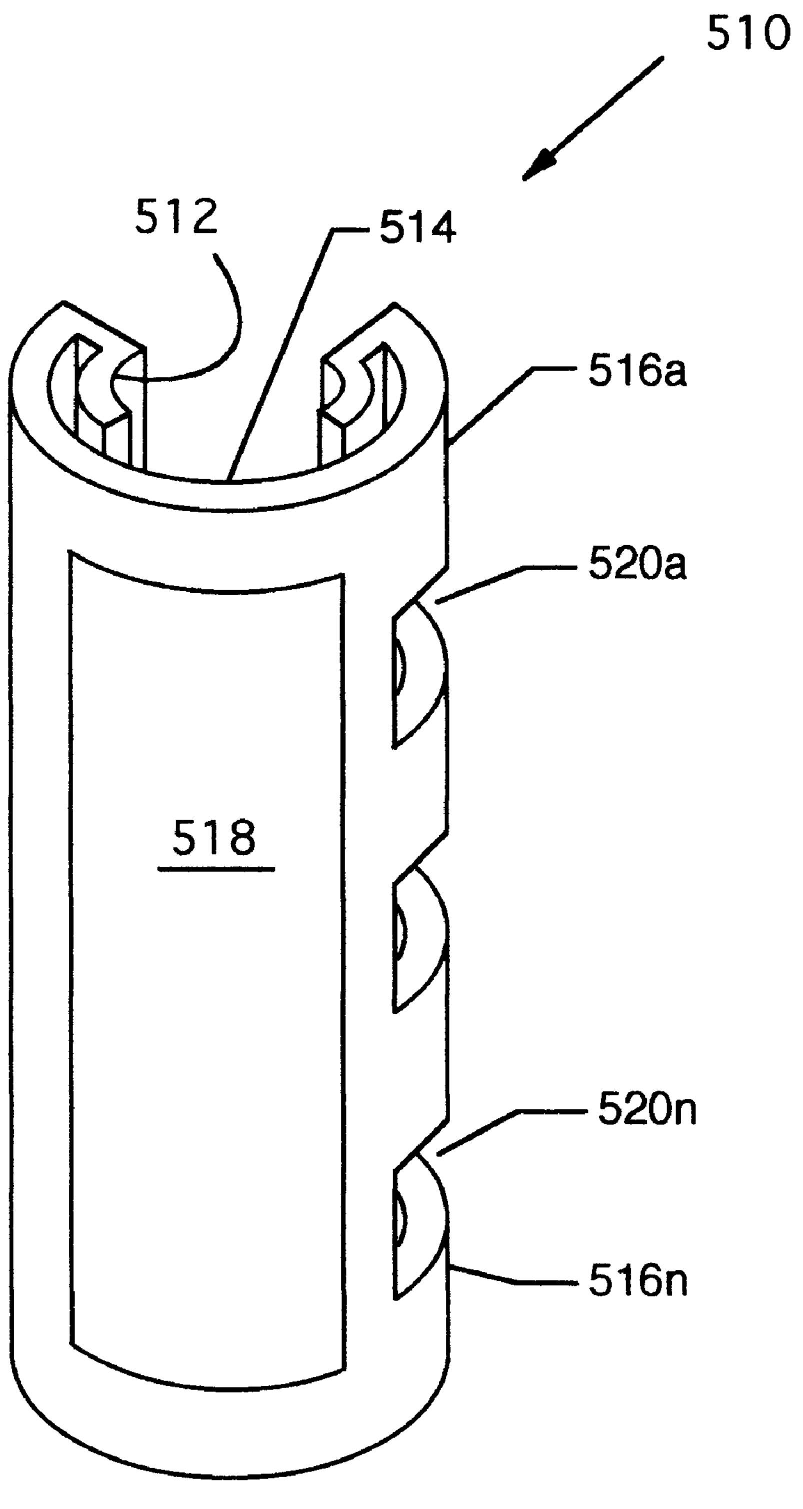
FIG. 11 illustrates an exaggerated front perspective view of a flexible labeling system used for plastic comb bound documents, the fifth alternative embodiment.

FIG. 11 illustrates an exaggerated front perspective view of a flexible labeling system 510 used for plastic comb bound documents, the fifth alternative embodiment. The flexible labeling system 510 is constructed of a flexible plastic and is comprised of an elongated hook 512, a centrally located spine 514 on which an adhesive label 518 is mounted, and a plurality of tab hooks 516*a*–516*n* with a plurality of interceding spaces 520*a*–520*n*. This embodiment enables the user to label plastic comb bound documents such as, but not limited to, GBC type bound documents, where the spine is not large enough to accommodate an adhesive label.

Figure 12:
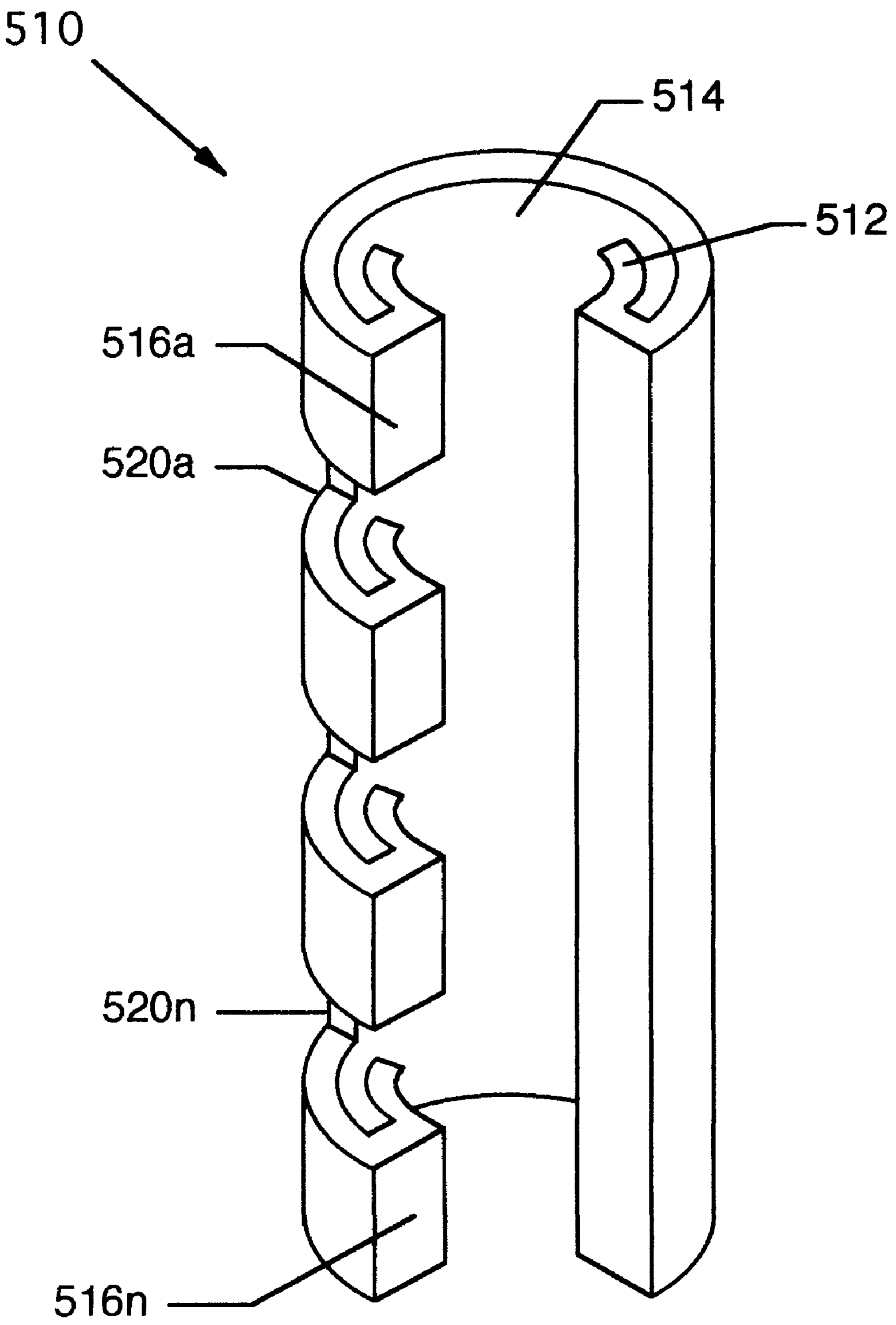
FIG. 12 illustrates an exaggerated rear perspective view of the flexible labeling system, the fifth alternative embodiment.

FIG. 12 illustrates an exaggerated rear perspective view of the flexible labeling system 510, the fifth alternative embodiment, where all numerals correspond to those elements previously described. Illustrated in detail are tab hooks 516*a*–516*n*, spaces 520*a*–520*n*, and elongated hook 512.

Figure 13:
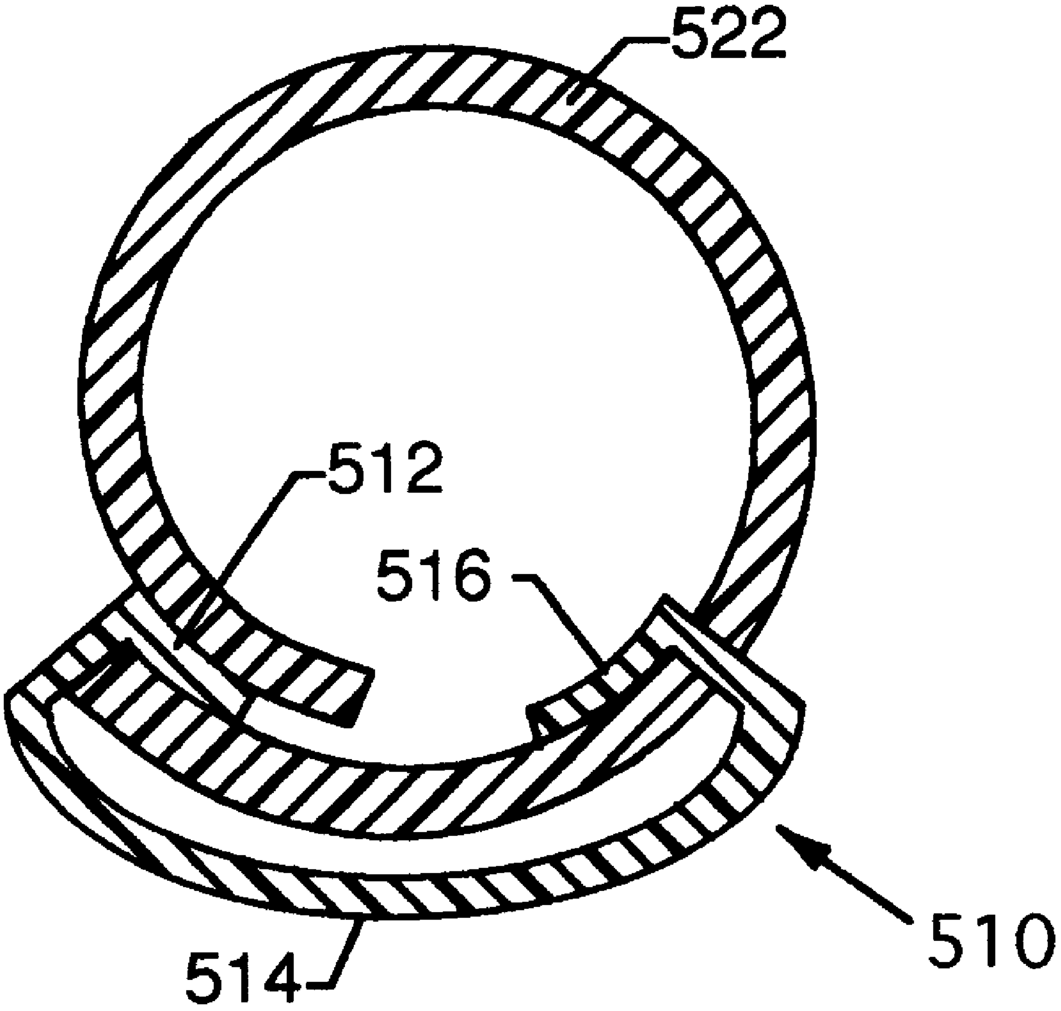
FIG. 13 illustrates a cross sectional top view of the flexible labeling system, the fifth alternative embodiment, in use with a plastic comb binding.

FIG. 13 illustrates a cross sectional top view of the flexible labeling system 510, the fifth alternative embodiment, in use with a plastic comb binding 522, where all numerals correspond to those elements previously described. Illustrated in particular is the hooking engagement of the elongated hook 512 and a tab hook 516*a* to the plastic comb binding 522. The tab hooks 516*a*–516*n* fit into the spaces between each tine of the plastic comb binding 522, and spaces 520*a*–520*n* accommodate each tine that binds the document together.

Figure 14:
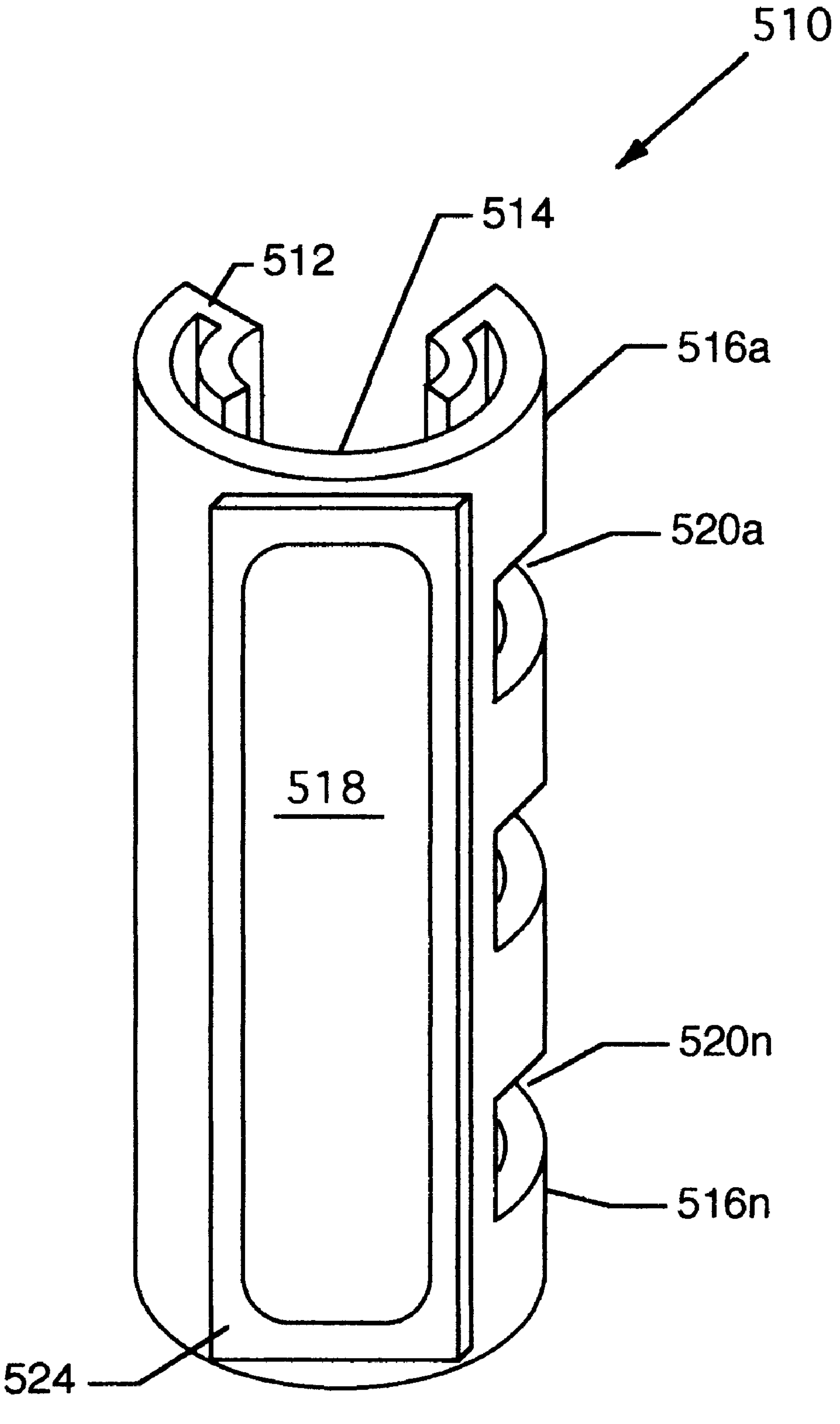
FIG. 14 illustrates the flexible labeling system, the fifth alternative embodiment, incorporating a stiffener to hold the label.

FIG. 14 illustrates the flexible labeling system 510, the fifth alternative embodiment, incorporating a stiffener 524 to hold the adhesive label 518, where all numerals correspond to those elements previously described. The stiffener 524 provides a flat surface for the adhesive label 518 to be adhered. The stiffener 524 can alternatively support a security strip or a label pocket, as described in the preferred embodiment and the third alternative embodiment, respectively.

Figure 15:
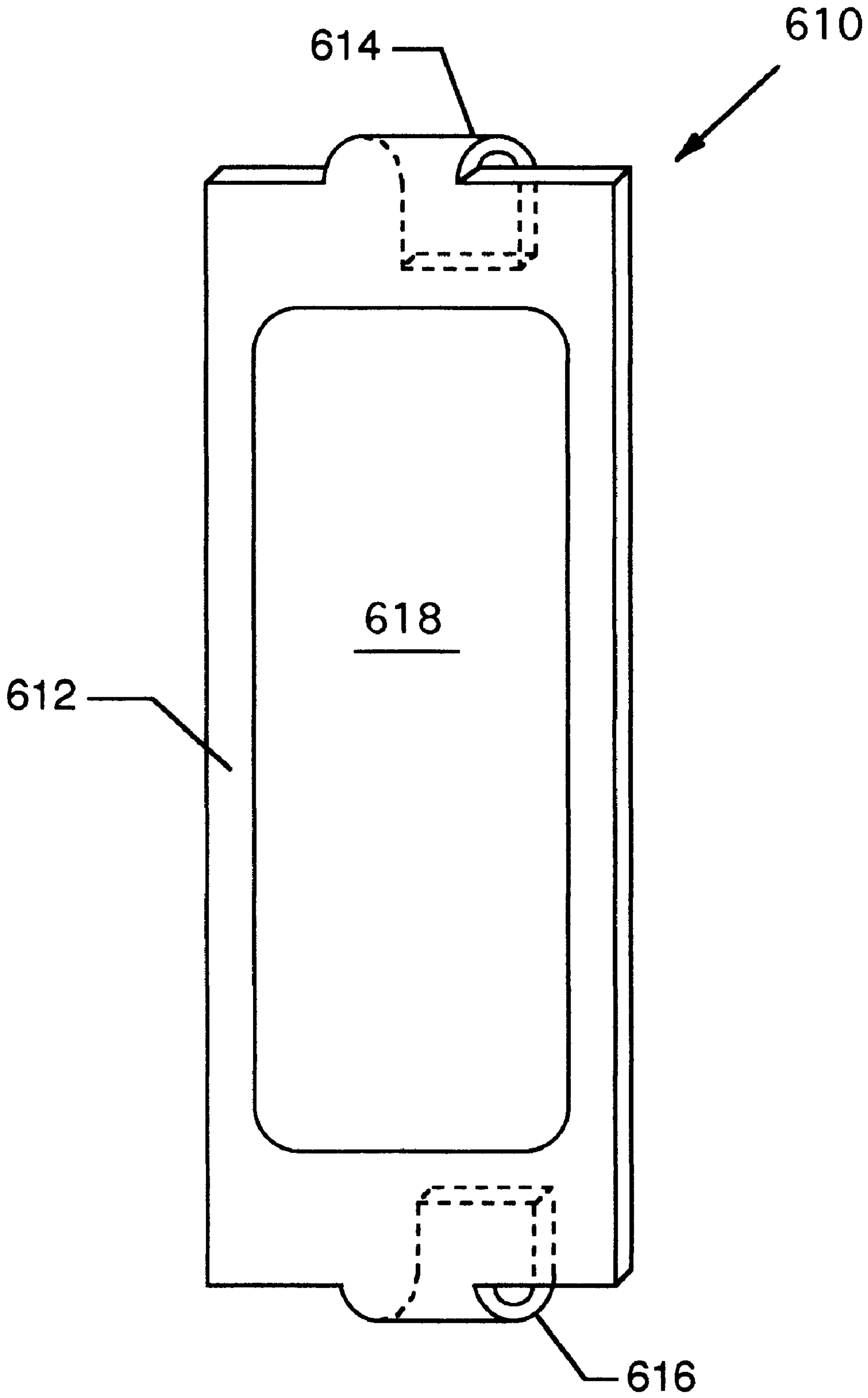
FIG. 15 illustrates a perspective view of a flexible labeling system used for wire coil bound documents, the sixth alternative embodiment; and, FIG. 16 illustrates a cross sectional side view of the flexible labeling system, the sixth alternative embodiment, in use with a wire coil bound document.

FIG. 15 illustrates a perspective view of a flexible labeling system 610 used for wire coil bound documents, the sixth alternative embodiment. The flexible labeling system 610 is comprised of a centrally located planar portion 612, upper and lower hook tabs 614 and 616, and an adhesive label 618. The flexible labeling system 610 is made of a flexible plastic and is used to provide a planar portion 612 for an adhesive label 618 which can be easily read on the wire coil of a coil bound document when the document is shelved.

Figure 16:
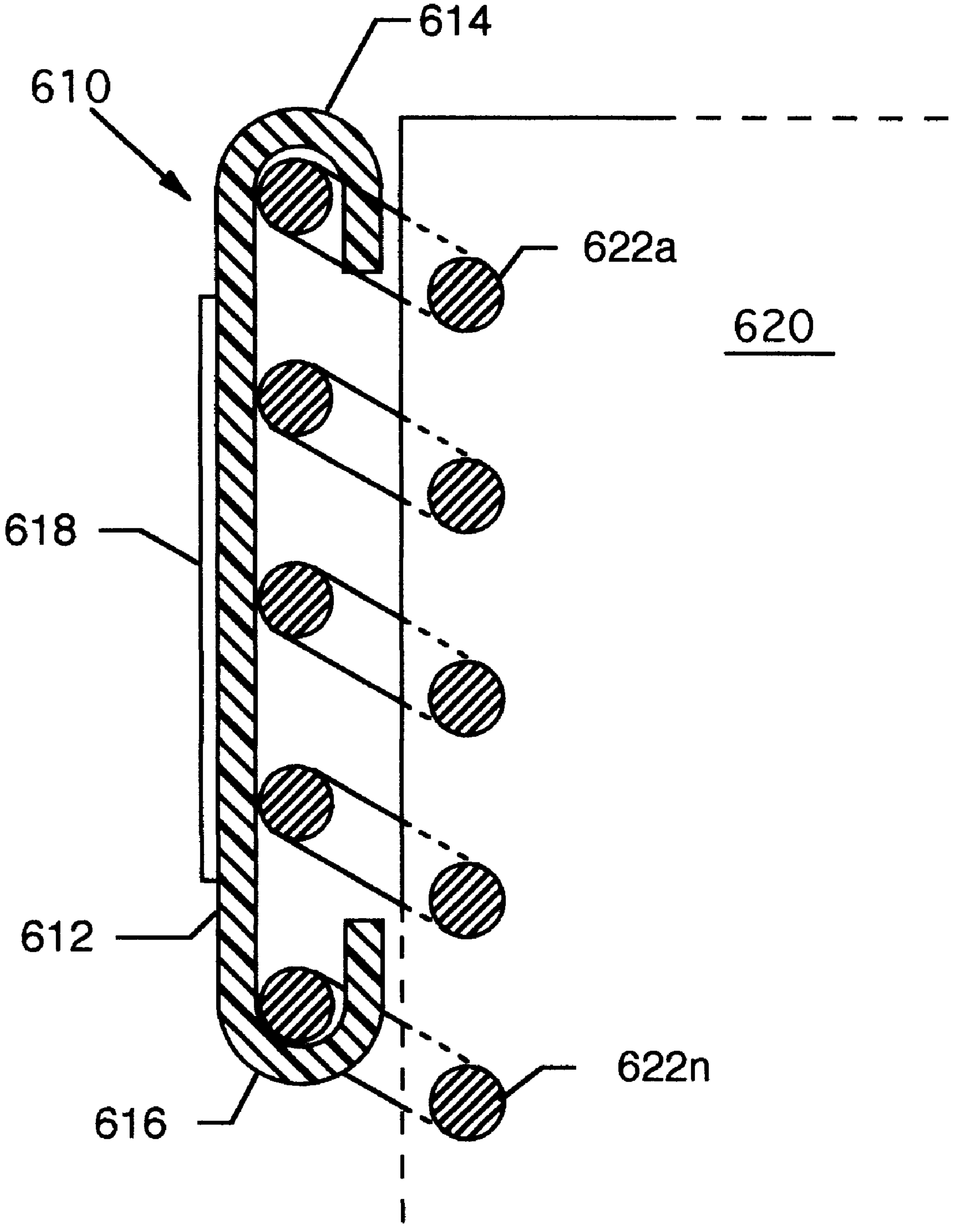

FIG. 16 illustrates a cross sectional side view of the flexible labeling system 610, the sixth alternative embodiment, in use with a wire coil bound document 620. Featured in this illustration is the hooking engagement of the flexible labeling system 610 where the upper hook tab 614 captures wire coil 622*a* and lower hook tab 616 captures wire coil 622*n* of wire coil bound document 620. The flex exhibited by the wire coils 622*a*–622*n* provides frictional engagement to hold the flexible labeling system 610 in position. The planar portion 612 can alternatively support a security strip or a label pocket as described in the preferred embodiment and the third alternative embodiment, respectively.

Various modifications can be made to the present invention without departing from the apparent scope hereof.

FLEXIBLE LABELING SYSTEM

| PARTS LIST | |
|---|---|
| 10 | flexible labeling system |
| 12 | flexible plastic member |
| 14 | flexible plastic portion |
| 16 | flexible plastic portion |
| 18 | flexible plastic portion |
| 20 | living hinge |
| 22 | living hinge |
| 24 | adhesive strip |
| 26 | adhesive strip |
| 28 | peel-off protective strip |
| 30 | peel-off protective strip |
| 32 | stiffener |
| 34 | adhesive label |
| 36 | adhesive |
| 38 | magazine |
| 40 | space |
| 42 | spine |
| 44 | groove |
| 46 | security strip |
| 110 | flexible labeling system |
| 112 | flexible plastic member |
| 114 | flexible plastic portion |
| 116 | flexible plastic portion |
| 118 | flexible plastic portion |
| 120 | living hinge |
| 122 | living hinge |
| 124 | adhesive strip |
| 126 | adhesive strip |
| 128 | peel-off protective strip |
| 130 | peel-off protective strip |
| 132 | stiffener |
| 134 | adhesive label |
| 136 | adhesive |
| 210 | extruded flexible labeling system |
| 212 | extruded flexible plastic member |
| 214 | flexible plastic portion |
| 216 | central thickened plastic portion |
| 218 | flexible plastic portion |
| 220 | living hinge |
| 222 | living hinge |
| 224 | adhesive strip |
| 226 | adhesive strip |
| 228 | peel-off protective strip |
| 230 | peel off protective strip |
| 234 | adhesive label |
| 310 | flexible labeling system |
| 312 | flexible plastic member |
| 314 | flexible plastic portion |
| 316 | flexible plastic portion |
| 318 | flexible plastic portion |

-continued

| PARTS LIST | |
|---|---|
| 320 | living hinge |
| 322 | living hinge |
| 324 | adhesive strip |
| 326 | adhesive strip |
| 328 | peel-off protective strip |
| 330 | peel-off protective strip |
| 332 | stiffener |
| 334 | non-adhesive label |
| 336 | label pocket |
| 338 | open end |
| 410 | flexible labeling system |
| 412 | flexible plastic member |
| 414 | flexible plastic portion |
| 416 | flexible plastic portion |
| 418 | flexible plastic portion |
| 424 | adhesive strip |
| 426 | adhesive strip |
| 432 | stiffener |
| 434 | adhesive label |
| 436 | expandable file folder |
| 438 | front member |
| 440 | back member |
| 442 | bellows portion |
| 444 | space |
| 510 | flexible labeling system |
| 512 | elongated hook |
| 514 | spine |
| 516a-n | tab hooks |
| 518 | adhesive label |
| 520a-n | spaces |
| 522 | plastic comb binding |
| 524 | stiffener |
| 610 | flexible labeling system |
| 612 | planar portion |
| 614 | upper hook tab |
| 616 | lower hook tab |
| 618 | adhesive label |
| 620 | wire coil bound document |
| 622a-n | wire coils |

I claim:

1. A flexible labeling system, comprising:

a. a one-piece, flexible plastic member including (1) a planar central portion having opposite edges, a front face, and a rear face, and (2) two planar side portions each having a front face and a rear face;

b. said two planar side portions forming living hinge junctures with said planar central portion along said opposite edges of said planar central portion and extending rearwardly of said planar central portion at obtuse angles with respect to said planar central portion;

c. said two planar side portions terminating in free edges spaced from said living hinges;

d. adhesive on said rear faces of said two planar side portions adjacent to said free edges thereof;

e. peel-off strips covering said adhesive on said rear faces of said two planar side portions; and, f. said front face of said planar central portion being of a size to accept a label viewable at said front face of said planar central portion.

2. The flexible labeling system as defined in claim 1, wherein said adhesive on said rear faces of said two planar side portions adjacent to said free edges thereof is in the form of continuous strips extending the entire lengths of said free edges.

3. The flexible labeling system as defined in claim 1, wherein said adhesive on said rear faces of said two planar side portions adjacent to said free edges thereof is in the form of discrete segments spaced along the lengths of said free edges.

4. The flexible labeling system as defined in claim 1, wherein said adhesive is a low tack adhesive which does not permanently set.

5. The flexible labeling system as defined in claim 1, wherein said adhesive is a high tack adhesive which will permanently set.

6. The flexible labeling system as defined in claim 1, and further including an adhesive label affixed to said front face of said planar central portion.

7. The flexible labeling system as defined in claim 1, and further including a transparent label pocket secured to said front face of said planar central portion.

8. The flexible labeling system as defined in claim 7, and including a non-adhesive label within said transparent label pocket.

9. The flexible labeling system as defined in claim 1, and further including a stiffener on said planar central portion.

10. The flexible labeling system as defined in claim 9, wherein said stiffener is located on said rear face of said planar central portion.

11. The flexible labeling system as defined in claim 9, wherein said stiffener is located on said front face of said planar central portion.

12. The flexible labeling system as defined in claim 9, wherein said stiffener is a separate element affixed to said planar central portion with an adhesive.

13. The flexible labeling system as defined in claim 1, wherein the thickness of said planar central portion between its front face and its rear face is greater than the thickness of each of said two planar side portions between their front faces and rear faces, thus producing a planar central portion which is stiffer than said two planar side portions.

14. The flexible labeling system as defined in claim 13, wherein said one-piece flexible plastic member is an extrusion.

15. The flexible labeling system as defined in claim 1, and further including:

a. a stiffener affixed to said planar central portion;

b. a groove in said stiffener; and, c. a security strip within said groove.

16. A flexible labeling system, comprising:

a. a unitary, one-piece flexible member composed of a central portion having front and rear faces and two side portions each having a front face and a rear face, said two side portions being positioned on opposite sides of said central portion, and each of said side portions being integrally joined to said central portion at an angle, extending rearwardly from said central portion, and terminating in a free edge remote from its joinder with said central portion;

b. adhesive on said rear faces of said two side portions adjacent to said free edges thereof;

c. peel-off strips covering said adhesive on said rear faces of said two side portions;

d. said central portion including a stiffener which serves to render said central portion stiffer than said two side portions; and e. said front face of said central portion being of a size to accept a label viewable at said front face of said central portion.

17. The flexible labeling system as defined in claim 16, wherein said adhesive on said rear faces of said two side portions adjacent to said free edges thereof is in the form of continuous strips extending the entire lengths of said free edges.

18. The flexible labeling system as defined in claim 16, wherein said adhesive on said rear faces of said two side portions adjacent to said free edges thereof is in the form of discrete segments spaced along the lengths of said free edges.

19. The flexible labeling system as defined in claim 16, wherein said adhesive is a low tack adhesive which does not permanently set.

20. The flexible labeling system as defined in claim 16, wherein said adhesive is a high tack adhesive which will permanently set.

21. The flexible labeling system as defined in claim 16, and further including an adhesive label affixed to said front face of said central portion.

22. The flexible labeling system as defined in claim 16, and further including a transparent label pocket secured to said front face of said central portion.

23. The flexible labeling system as defined in claim 22, and including a non-adhesive label within said transparent label pocket.

24. The flexible labeling system as defined in claim 16, wherein said stiffener is a separate element affixed to said rear face of said central portion with an adhesive.

25. The flexible labeling system as defined in claim 16, wherein said stiffener is a separate element affixed to said front face of said central portion with an adhesive.

26. The flexible labeling system as defined in claim 16, wherein the thickness of said central portion between its front face and its rear face is greater than the thickness of each of said side portions between their front faces and rear faces, such greater thickness of said central portion constituting said stiffener.

27. The flexible labeling system as defined in claim 16, and further including a security strip disposed with said stiffener.

28. A labeled article, comprising:

a. an article having two surfaces connected by a spine or edge too narrow to bear recognizable print for identification;

b. a flexible labeling system which comprises:

(1) a unitary, one-piece flexible member composed of a central portion having front and rear faces and two side portions each having a front face and a rear face, said two side portions being positioned on opposite sides of said central portion, and each of said side portions being integrally joined to said central portion at an angle, extending rearwardly from said central portion, and terminating in a free edge remote from its joinder with said central portion;

(2) adhesive on said rear faces of said two side portions adjacent to said free edges thereof;

(3) said central portion including a stiffener which serves to render said central portion stiffer than said two side portions; and, (4) said front face of said central portion carrying a label; and c. said flexible labeling system being attached to said article with said central portion overlying and abutting said spine or edge of said article and with said two side portions extending along said two surfaces of said article and secured thereto by said adhesive on said two side portions, thereby providing a readily visible label on said article at the spine or edge thereof.

29. The labeled article as defined in claim 28, wherein said two surfaces of said article can be moved away from each other with said spine or edge serving as a hinge, and wherein when so moved, said flexible labeling system flexes and moves out of abutment with said spine or edge thereby producing no stress upon the central portion of said flexible member.

30. The labeled article as defined in claim 28, wherein said article is a magazine having a front cover and a rear cover, and wherein said two surfaces are the outside of the front cover of the magazine and the outside of the rear cover of the magazine.

31. The labeled article as defined in claim 28, wherein said article is an album, and wherein said two surfaces are the outside surfaces of the album.

32. A labeled article, comprising:

a. an expandable file folder having two exterior surfaces connected by a bellows or accordion spine;

b. a flexible labeling system which comprises:

(1) a unitary, one-piece flexible member composed of a central portion having front and rear faces and two side portions each having a front face and a rear face, said two side portions being positioned on opposite sides of said central portion, and each of said side portions being integrally joined to said central portion at an angle, extending rearwardly from said central portion, and terminating in a free edge remote from its joinder with said central portion;

(2) adhesive on said rear faces of said two side portions adjacent to said free edges thereof;

(3) said central portion including a stiffener which serves to render said central portion stiffer than said two side portions; and, (4) said front face of said central portion carrying a label; and, c. said flexible labeling system being attached to said expandable file folder with said central portion overlying said bellows or accordion spine and with said two side portions attached to said expandable file folder by said adhesive on said two side portions, thereby providing a readily visible label on said expandable file folder at the spine thereof.

33. The labeled article as defined in claim 32, wherein said two side portions are attached to said two exterior surfaces of said expandable file folder.

34. The labeled article as defined in claim 32, wherein said two side portions are attached to spaced portions of said bellows or accordion type spine of said expandable file folder.

* * * * *